Patented May 25, 1954

2,679,496

UNITED STATES PATENT OFFICE 2,679,496

PRODUCTION OF ORGANOSILICON COATING COMPOSITIONS

Raymond H. Bunnell, Toledo, Ohio, assignor, by mesne assignments, to Allied Chemical & Dye Corporation, New York, N. Y., a corporation of New York No Drawing. Application August 7, 1950, Serial No. 178,158

25 Claims. (Cl. 260—46.5)

The invention relates to organosilicon coating compositions that form coatings of improved durability.

A great need has existed heretofore for an organosilicon coating composition that produces coatings of satisfactory hardness. In order to harden the coatings heretofore produced from organosilicon coating compositions, it has been necessary to resort to baking at elevated temperatures. The results produced by baking coatings of the organosilicon compositions heretofore known have not been satisfactory, however, because the hardening that occurred when such organosilicon compositions were baked was the result of extreme condensation and dehydration, which tended to cause shrinkage and cracking and produced brittle products.

The principal object of the invention is to provide a novel organosilicon coating composition which produces coatings that are hard but not brittle. More specific objects and advantages are apparent from the description, which illustrates and discloses but is not intended to limit the invention.

Cyclohexyltrichlorosilane heretofore has been considered substantially useless for the production of organosilicon compositions by hydrolysis. Most chlorosilanes can be hydrolyzed to produce solutions that can be used as ingredients for coating compositions, but the hydrolysis of cyclohexyltrichlorosilane ordinarily produces a useless insoluble precipitate.

The present invention is based upon the discovery that although the hydrolysis of cyclohexyltrichlorosilane ordinarily produces a useless precipitate, cyclohexyltrichlorosilane, or a related cycloaliphaticsilane of a certain class, can be used in combination with certain other organosilanes, in certain specific proportions, to produce hydrolysis products that form non-brittle coatings of remarkable hardness.

For example, although coatings made from the products of the hydrolysis of a mixture of an ethyltrihalosilane and a diethyldihalosilane, as disclosed in United States Patent No. 2,258,220, are excessively brittle and are subject to severe cracking and crazing, a composition embodying the invention, produced by hydrolysis of a mixture of a cyclohexyltrihalosilane, and ethyltrihalosilane and a diethyldihalosilane in the proportions of the invention produces clear, crack-free coatings which cure faster and are harder and more flexible than coatings made from the products of the hydrolysis of the ethylsilanes alone.

A coating composition embodying the invention, which forms coatings of improved durability, comprises a substance having an average unit structure corresponding to the formula

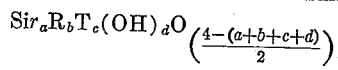

wherein $r$ is a primary radical having from one to nine carbon atoms; R is a radical having from three to nine carbon atoms in which the free valence is attached to a secondary acyclic carbon atom; T is a radial having a single cycloaliphatic nucleous containing from five to six carbon atoms each of which is connected to at least one hydrogen atom and one of which is connected to the free valence, having from five to thirteen carbon atoms, and having not more than three side chains containing a total of not more than seven carbon atoms; $a$ is a number from 0 to 1.60; $b$ is a number from 0 to 0.75; the sum of $a$ and $b$ is at least 0.2 but not more than 1.60; $c$ is a number from 0.10 to 0.8; the sum of $a$, $b$ and $c$ is not greater than 1.7; the silicon atoms to which radicals $r$, R and T are attached constituting not less than 60 per cent of the total silicon atoms; and not more than 80 per cent of the former silicon atoms having radicals T attached thereto. For the sake of brevity, a substance having such an average unit structure is hereinafter referred to as a "siloxane of the invention." It is to be understood in connection with the above structural formula that in no case does any substantial number of silicon atoms have more than one cycloaliphatic (T) radical attached thereto.

*Siloxane.*—In the structure of a siloxane of the invention a primary radical ($r$) having from one to nine carbons atoms is one in which the free valence is attached to a primary acyclic carbon atom. Compounds of this type may be (1) a straight or branched chain primary alkyl radical having from one to nine carbon atoms (i. e., a methyl, ethyl, 1-propyl, 1-butyl, isobutyl, 1-pentyl, isoamyl, 1-hexyl, isohexyl, 1-heptyl, isoheptyl, 1-octyl, isooctyl, 1-nonyl or isononyl radical); (2) an aralkyl radical having not more than nine carbon atoms which consists of a primary alkyl radical having from one to three carbon atoms in which one hydrogen atom has been replaced by an aryl radical having from six to seven carbon atoms and having no substituents or having from one to three nuclear substituents each of which is a halogen of atomic weight less than 80 (i. e., chlorine, bromine or fluorine) (such aralkyl radicals include benzyl, beta-phenylethyl, beta - tolylethyls, beta - phenylpropyl, gamma-phenylpropyl, beta-(chlorophenyl)ethyls, beta-(trichlorophenyl)ethyls, beta-(dichlorophenyl)-ethyls and beta-(dichlorophenyl)propyls or (3) a radical as described in (1) or (2) above in which from one to three hydrogen atoms attached to acyclic carbon atoms (other than a carbon atom connected to the carbon atom to which is connected the free valence) have been replaced by halogen atoms having an atomic weight less than 80 (such radicals include alpha-halo- and gamma-halo-substituted propyl, alpha-halo-, gamma-halo- and delta-halo-substituted butyl, but not beta-halo-substituted propyl or butyl since such radicals, under the hydrolysis conditions hereinafter described, tend to decompose with the splitting off of an olefin from the silane molecule.

"Acyclic carbon atom" is used herein means a carbon atom which is not contained in a ring system, i. e., is contained in an acyclic radical (a straight or branched chain monovalent aliphatic radical having saturated

bonds) or in the acyclic part of an aryl-substituted acyclic radical. Thus, in the structure of a siloxane of the invention, a radical (R) having from three to nine carbon atoms in which the free valence is attached to a secondary acyclic carbon atom may be (1) any straight or branched chain secondary alkyl radical having from three to nine carbon atoms (i. e., an isopropyl, a secondary butyl or any secondary amyl, hexyl, heptyl, octyl or nonyl radical); (2) an aralkyl radical having not more than nine carbon atoms which consists of (a) a primary alkyl radical having from two to three carbon atoms in which one hydrogen atom that is attached to the carbon atom connected to the free valence has been replaced by an aryl radical having from six to seven carbon atoms and having no substituents or having from one to three nuclear substituents each of which is a halogen of atomic weight less than 80 or (b) an isopropyl radical in which a hydrogen atom in the beta position has been replaced by such an aryl radical (such aralkyl radicals include alpha-phenylethyl, alpha-tolyl-ethyls, alpha-phenylpropyl, alpha-(chlorophenyl)ethyls, alpha-(trichlorophenyl)ethyls, alpha-(dichlorophenyl)ethyls and alpha-(dichlorophenyl)propyls; or (3) a radical as described in (1) or (2) above in which from one to three hydrogen atoms attached to acyclic carbon atoms (other than a carbon atom connected to the carbon atom to which is connected the free valence) have been replaced by halogen atoms having an atomic weight less than 80.

In the structure of a siloxane of the invention a radical (T) having a single cycloaliphatic nucleus containing from five to six carbon atoms each of which is connected to at least one hydrogen atom and one of which is connected to the free valence, having from five to thirteen carbon atoms, and having not more than three side chains containing a total of not more than seven carbon atoms may be a cyclopentyl, a cyclohexyl, or an alkyl-substituted or aryl-substituted cyclopentyl or cyclohexyl radical, in which the side chains, if any, are one, two or three in number, and not more than one side chain is bonded to any one nuclear carbon atom. Each side chain may be a primary, secondary or tertiary alkyl radical having from one to five carbon atoms, or an aryl radical having not more than seven carbon atoms and having no substituents or having from one to three nuclear substituents each of which is a halogen having an atomic weight less than 80 (i. e., the aryl side chain may be a phenyl, tolyl, or mono-, di- or tri-halo-substituted phenyl or tolyl radical), the total number of carbon atoms in the side chains being from one to seven.

*Silane starting materials.* — Coating compositions embodying the invention are produced by a method that includes, subjecting to condensation a composition comprising products of the hydrolysis of (1) one or more silanes of the class having the general formula

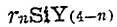

hereinafter referred to as primary alkyl(or aralkyl) silanes, and/or one or more silanes of the class having the general formula

hereinafter referred to as secondary alkyl(or aralkyl)silanes; and (2) one or more silanes of the class having the general formula

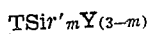

hereinafter referred to as cycloaliphaticsilanes. Such a composition may also comprise (3) one or more products of the hydrolysis of silanes of the class having the general formula

hereinafter referred to as tetra-functional silanes. A silane (or mixture of silanes) in each of the above classes may be hydrolyzed and isolated and then a mixture of the hydrolyzed and isolated silanes may be condensed to form the advantageous compositions of the invention. A simpler, more convenient procedure for practicing the invention, however, involves the preparation of a mixture of silanes of the above classes and the hydrolysis and condensation of this mixture. Thus the discussion hereinafter of the production of coating compositions of the invention is directed primarily to this preferred procedure, although in general, the same conditions apply in the present method conducted by either procedure.

In the above general formulas, $r$, R and T are as hereinbefore defined, $r'$ is methyl or ethyl, Y is a hydrolyzable radical, Y' is hydrogen or hydrolyzable radical; $n$ is a number from one to two and $m$ is a number from zero to one. Either the primary alkyl(or aralkyl)silanes or the cycloaliphaticsilanes used may constitute a mixture of a silane having three hydrolyzable radicals attached to the silicon atom in the silane molecule and a silane having two hydrolyzable radicals attached to the silicon atom in the silane molecule. When the method of preparing the primary alkyl(or aralkyl)silanes, e. g., ethylsilanes yields a mixture of mono- and di-alkyl (e. g., mono and di-ethyl) compounds, this mixture, alone, or modified by addition of one of the constituents, may be used.

"Hydrolyzable radical" is used herein to include halo, alkoxy, amino, aroxy and acyloxy.

The halo radical is any one having an atomic weight less than 80. The alkoxy radical is any primary or secondary alkoxy radical having from one to four carbon atoms (i. e., methoxy, ethoxy, propoxy, isopropoxy, n-butoxy, isobutoxy or secondary butoxy). Amino is simply the —NH₂ group. Aroxy radicals are any in which the aryl group is phenyl, or a mono-, di- or tri-substituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methyl phenyl, any di- or tri-methyl phenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula

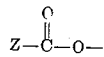

in which Z is a saturated or unsaturated straight, branched or closed chain hydrocarbon radical having from one to eighteen carbon atoms, or phenyl or substituted phenyl, the substituents. if any, consisting of from one to three alkyl radicals each having from one to five carbon atoms, and all having a total of not more than five carbon atoms, as hereinbefore described.

Examples of primary alkyl (or aralkyl) silanes that may be used as starting materials in the production of coating compositions embodying the invention include: methyltrichlorosilane, methyltribromosilane, methyltrifluorosilane, ethyltrifluorosilane, diethyldifluorosilane, ethyltrichlorosilane, diethyldichlorosilane, diethyldiethoxysilane, diethylchloroethoxysilane, ethyltrimethoxysilane, ethyltriethoxysilane, ethylchlorodiethoxysilane, ethyltripropoxysilane, ethyltri-1-butoxysilane, ethyltriisopropoxysilane, 1-propyltrichlorosilane, 1-propyltrifluorosilane, 1-propyltriethoxysilane, dipropyldiethoxysilane, dipropyldichlorosilane, 1-butyltrichlorosilane, isobutyltrichlorosilane, 1-butyltriethoxysilane, isobutyltriethoxysilane, dibutyldifluorosilane, 1-butyltributoxysilane, 1-pentyltrichlorosilane, isoamyltrichlorosilane, 1-pentyltrifluorosilane, 1-pentyltriethoxysilane, di-1-pentyldifluorosilane, 1-hexyltrichlorosilane, 1-hexyltriethoxysilane, 1-heptyltrichlorosilane, 1 - octyltrichlorosilane, alpha-chloroethyltrichlorosilane, alpha-chloropropyltrichlorosilane, gamma-chloropropyltrichlorosilane, gamma-chlorobutyltrichlorosilane, delta-chlorobutyltrichlorosilane, alpha-chlorobutyltrichlorosilane, benzyltrichlorosilane, beta-phenylethyltrichlorosilane, beta-tolylethyltrichlorosilanes, beta-phenylpropyltrichlorosilane, gamma-phenylpropyltrichlorosilane, beta-(chlorophenyl)ethyltrichlorosilanes, beta-(trichlorophenyl)ethyltrichlorosilanes, beta-(dichlorophenyl)ethyldichlorosilanes and beta-(dichlorophenyl)propyltrichlorosilanes.

Examples of secondary alkyl(or aralkyl)silanes that may be used as starting materials in the production of coating compositions embodying the invention include: isopropyltrichlorosilane, secondary butyltrichlorosilane, secondary amyltrichlorosilanes, secondary hexyltrichlorosilanes, secondary octyltrichlorosilanes, secondary nonyltrichlorosilanes, alpha - phenylethyltrichlorosilane, alpha-tolylethyltrichlorosilanes and alpha-(chlorophenyl)ethyltrichlorosilanes.

Examples of tetra-functional silanes that may be used as starting materials in the production of coating compositions embodying the invention include: ethyl orthosilicate, propyl orthosilicate, butyl orthosilicate, phenyl orthosilicate, silicon tetrachloride, silicon tetrafluoride, silicochloroform, triethoxysilane and silicon tetrabromide.

Examples of cycloaliphaticsilanes that may be used as starting materials in the production of coating compositions embodying the invention include: cyclohexyltrichlorosilane, cyclohexylmethyldichlorosilane, trimethylcyclohexyltrichlorosilanes, p - tertiaryamylcyclohexyltrichlorosilane, phenylcyclohexyltrichlorosilanes and tolylcyclohexyltrichlorosilanes.

Although cycloaliphaticsilanes have been prepared by means of a Grignard reaction between a cycloaliphatic magnesium halide and a tetrahalosilane or an alkyl orthosilicate, the yield from such a reaction is comparatively low. A preferred method for preparing cycloaliphaticsilanes involves a vapor phase reaction between a cycloalkene and a halosilane. Such a reaction is conducted between a silane having, attached to the silicon atom in the silane molecule, one hydrogen atom and three other radicals, one of which may be either methyl or ethyl and the remainder of which are halo, and a cycloalkene containing the characteristic structural constituent

The cycloalkene can be cyclopentene, cyclohexene or any monoalkyl-, dialkyl- or trialkyl-substituted cyclopentene or cyclohexene in which each alkyl substituent has from one to five carbon atoms, and the total number of carbon atoms in all the alkyl side chains is not more than seven, as hereinbefore described. This reaction can be used to produce any cycloaliphaticsilane in which the hydrolyzable groups are halo radicals. The reaction is usually conducted at temperatures between about 200° C. and about 400° C. and at superatmospheric pressures as high as about 2,000 pounds per square inch gauge.

Aralkylsilanes, and cycloaliphaticsilanes in which a cycloaliphatic nucleus is aryl-substituted, may be prepared by reacting the corresponding halo-substituted alkyl(or cycloalkyl)silane with an aromatic hydrocarbon in the presence of an aluminum halide catalyst in which each halogen atom has an atomic weight between 35 and 80 (i. e., chlorine or bromine). In such a reaction the halogen atom is split out of the haloalkyl(or halocycloalkyl) radical in the silane molecule and a hydrogen atom is split out of the aromatic nucleus in the aromatic hydrocarbon molecule so that the two reacting molecules are linked into a single molecule by a

bond. It is preferred that the molar ratio of the aromatic compound to the haloalkyl(or halocycloalkyl)silane be approximately 3 to 1, and that the proportion of the aluminum halide catalyst be between .75 and 2 mol per cent (based on the amount of the haloalkyl(or halocycloalkyl)silane present in the reaction mixture). Usually, about ¼ to ⅓ of the total amount of the aluminum halide is added very carefully at room temperature to the mixture of silane and aromatic hydrocarbon, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions. It is usually desirable to remove the aluminum halide catalyst before distillation to obtain the pure aralkyl(or aryl-substituted cycloalkyl)silane. Aluminum chloride may be removed by adding phosphorus oxychloride to the reaction mixture. The phosphorus oxychloride binds the aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (170° C.). After further cooling an amount of a hydrocarbon solvent equal to the volume of the reaction mixture is added to precipitate the $AlCl_3 \cdot POCl_3$ complex. Such hydrocarbon solvents include pentane, ligroin and petroleum ethers. The mixture is allowed to stand over night, and the solid complex is filtered from the solution or the liquid to be distilled is decanted from the mixture, leaving a residue containing the $AlCl_3 \cdot POCl_3$ complex. An absorbing agent such as kieselguhr may be added in place of or in addition to the hydrocarbon solvent to absorb the $AlCl_3 \cdot POCl_3$ complex, and after the reaction mixture cools to room temperature the liquid to be distilled may be filtered from the absorbed complex. There is less chance that aluminum chloride will distill with the product when it is in the form of a complex than when it is in the free state, and when this complex is relatively non-volatile as compared to the organosilane product the product may be distilled under reduced pressure in the presence of the $AlCl_3 \cdot POCl_3$ complex.

*Molecular structure of siloxane.*—The average number of hydrolyzable radicals determines, in part, the molecular structure that results after hydrolysis and condensation of silanes. ("Average number of hydrolyzable radicals," as used herein, signifies the total number of hydrolyzable radicals attached to the silicon atoms in the molecules of the silane starting materials divided by the total number of silicon atoms therein.) The reactions which occur during the course of the hydrolysis and condensation of silanes are understood to be represented by equations 1 and 2 below:

(1) 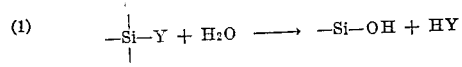

(2) 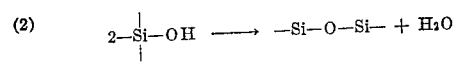

in which Y is a hydrolyzable radical as hereinbefore described. Hydrolysis and condensation of a single silane having, attached to the silicon atom in the silane molecule, three hydrolyzable radicals yields cross-linked siloxanes; hydrolysis and condensation of a silane having two hydrolyzable radicals yields linear or cyclic siloxanes; while hydrolysis and condensation of a silane having one hydrolyzable radical yields disiloxanes. In general, in a mixture of silanes the average number of hydrolyzable groups attached to the silicon atoms determines the molecular structure of the resulting siloxanes in much the same way. Therefore, in order to obtain a curable resin it is usually desirable that the resin be derived by hydrolysis of silane compositions having an average number of hydrolyzable radicals at least between two and three.

In the production of the present coating compositions, it is possible to conduct the hydrolysis reaction simply by adding a silane or mixture of silanes to water or, in the case of silanes which are less readily hydrolyzed, to a hydrolyzing solution of an inorganic acid in water. As is indicated by Equation 1, above, the hydrolyzable radicals in the silane starting materials are removed from the silane molecules in the first stage of the hydrolysis reaction and silanols are produced, at least as intermediates. Although in some instances it is possible to isolate silanols (e. g., diethylsilanediol or diphenylsilanediol), the condensation reaction (i. e., the reaction represented by Equation 2) is usually understood to take place, at least to a slight extent, concurrently with or immediately following hydrolysis. In the practice of the invention the extent of the condensation reaction is controlled so that the resulting siloxane (in which different silicon atoms are attached to an oxygen atom in what is believed to be an

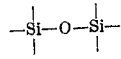

linkage) is a siloxane of the invention having the desired molecular weight and viscosity. It is believed that some OH groups attached to silicon atoms are always present in the coating compositions of the invention since such compositions are not completely condensed resins, i. e., insoluble gels. Thus in the formula which represents the average unit structure of a siloxane of the invention the average number of OH groups per silicon atom is represented by the letter "$d$." The numerical value of "$d$" in any composition of the invention is not known. However, in the structure of compositions of the invention which have been bodied to a substantially cured state (but not to a gelled state—the compositions are still soluble), the numerical value of "$d$" is relatively constant. It is believed that further condensation in coatings produced from such compositions does not take place to any appreciable extent. On the other hand coatings produced from air-drying compositions of the invention which have not been bodied to any great extent may gradually undergo further condensation so that in such coating compositions the ratio between the oxygen atoms connecting silicon atom in

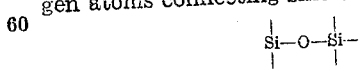

linkage and the hydroxy groups attached to silicon atoms is variable.

Because the hydrolyzable radicals are removed from the silanes in the first step of hydrolysis it does not matter which hydrolyzable radical or radicals are present in the silane starting materials. The significant radical for the purposes of the present invention is —OH, and any radical that is replaced upon hydrolysis by —OH, can be used in the practice of the invention. For this reason economic considerations govern the choice of hydrolyzable radicals. The least expensive and most readily available are preferred, but the by-products formed in the reaction may also govern the choice of hydrolyzable radicals. (For example, since vapors from methoxysilanes are highly toxic, it is usually not desirable to hydrolyze silane mixtures in which the hydrolyzable radicals are methoxy radicals.) Thus, the basis of the invention is the production of superior coatings by the condensation of a mixture of silanols derived from the classes of hydrolyzable silanes hereinbefore described. It is preferred that the hydrolyzable radicals in any one mixture of silanes used in the production of compositions of the invention be chloro or ethoxyradicals. Although the hydrolyzable radicals in any one mixture of silanes which is hydrolyzed in the practice of the invention may be different, it is preferred that they be the same, since the hydrolysis (and subsequent condensation) is more readily controlled when all the hydrolyzable radicals are the same.

As hereinbefore described the molecular structure of the siloxanes produced depends in part upon the average number of hydrolyzable radicals in the silanes used. This fact may be expressed in another way by saying that the molecular structure of the siloxanes depends upon the average number of non-hydrolyzable radicals attached to the silicon atoms in the silane molecules. The ratio $r/Si$ in which $r$ is the total number of non-hydrolyzable radicals attached to silicon atoms in the molecules of the siloxanes and Si is the total number of silicon atoms therein, represents the average number of non-hydrolyzable radicals.

In general the ratio of the total number of non-hydrolyzable radicals (i. e., primary and secondary alkyl (and aralkyl) radicals and cycloaliphatic radicals) to the total number of silicon atoms in the molecular structure of a siloxane of the invention (i. e., the $r/Si$ ratio, or the sum of $a$, $b$ and $c$ in the formula given above corresponding to the average unit structure of a siloxane of the invention) is at least about 0.6 and is not higher than about 1.7. The properties of coating compositions of the invention vary not only in accordance with the average $r/Si$ ratio of the siloxanes in such compositions, but also with the proportions and types of organic radicals from which the $r/Si$ ratio of the siloxanes is derived. All compositions of the invention have in common an improvement in the durability of coatings produced from such compositions over coatings produced from compositions which are similar but which are not, however, derived from silane starting materials comprising cycloaliphatic silanes.

*Preparation of siloxane.*—In the production of the present coating compositions, which comprise siloxane of the invention, the minimum amount of a cycloaliphaticsilane used is that which produces an appreciable improvement in the durability of coatings produced from such compositions. In general a cycloaliphaticsilane (one or a mixture thereof) should comprise at least about 10 mol per cent of the silane starting materials. The maximum amount of a cycloaliphaticsilane used in the practice of the invention is that above which an undesirable brittleness is produced in coatings of the present compositions. In general, a cycloaliphaticsilane (one or a mixture thereof) should comprise not more than about 80 mol per cent of the silane starting materials hereinbefore described, other than tetra-functional silanes. For example, it is not feasible to prepare a composition of the invention from a mixture comprising 80 mol per cent of a cycloaliphaticsilane whose molecule contains two hydrolyzable radicals (e. g., a cyclohexylethyldichlorosilane) and 20 mol per cent of a tetra-functional silane (e. g., silicon tetrachloride). Although the total number of primary alkyl and cycloaliphatic radicals per silicon atom in such a mixture would be within the ranges in the formula for the average unit structure of a siloxane of the invention, the percentage of silicon atoms having cycloaliphatic radicals attached thereto would exceed the limit of 80 per cent of the total number of silicon atoms to which primary alkyl (or aralkyl), secondary alkyl (or aralkyl) and cycloaliphatic radicals are attached, and such compositions would form coatings which would be too brittle to be commercially useful.

Primary alkyl (or aralkyl) silanes may comprise from 0 to 90 mol per cent of the silane starting materials in the production of the present compositions. Since, however, the number of alkyl (or aralkyl) radicals per silicon atom in the average unit structure of a siloxane of the invention should not be higher than 1.60, di-alkyl (or aralkyl) silanes cannot comprise more than about 80 mol per cent of the silane starting materials.

Secondary alkyl (or aralkyl) silanes may comprise from 0 to 75 mol per cent of the silane starting materials in the production of the present compositions. (Compositions produced from higher amounts of secondary silanes are not curable rapidly enough to be commercially useful.)

Primary alkyl (or aralkyl) silanes and/or secondary alkyl (or aralkyl) silanes should comprise at least 20 mol per cent of the silane starting materials in the production of the present compositions. Such silanes in which from one to three hydrogen atoms attached to carbon atoms (which are not in the beta-position) in an alkyl radical have been replaced with halogens, as hereinbefore described, should comprise not more than about 20 mol per cent and preferably not more than about 10 mol per cent of the silane starting materials, since there is danger that HCl may be liberated from compositions produced from such halo-substituted silanes.

Limited amounts of other silanes, such as arylsilanes (e. g., phenyltrichlorosilane), may also be employed in the practice of the invention. Arylsilanes, however, are not nearly as effective as cycloaliphaticsilanes in improving the hardness of coatings produced from the present compositions, although they may add toughness to the coatings. Since their use reduces the speed of cure of compositions of the invention of higher $r/Si$ ratio, their use in amounts larger than about 20 mol per cent of the silane starting materials should be avoided.

When tetra-functional silanes are used in the production of coating compositions of the invention that are not bodied (by heating, as hereinafter discussed), such silanes may be composed entirely of silanes having the general formula $$SiHY_3$$

wherein Y is a hydrolyzable radical, as hereinbefore defined. (Such silanes include, e. g., silicochloroform and triethoxysilane.) However, in the production of coating compositions of the invention which are bodied to any substantial extent, the amount of such tetra-functional silanes used may only be such that the number of hydrogen atoms per silicon atom in the average unit structure of the siloxanes in such compositions is not higher than about one-sixth of the total number of non-hydrolyzable organic radicals per silicon atom. The use of larger amounts of silanes such as silicochloroform in the production of siloxane compositions which are to be bodied to non-tacky resins may cause gelling of the resins during the bodying step. It is to be understood, of course, that when a tetra-functional silane whose molecule contains a hydrogen atom attached to a silicon atom (e. g., silicochloroform) is used in the production of compositions of the invention, hydrogen atoms are present in place of some of the hydroxy groups represented in the formula for the average unit structure of the siloxanes of the invention. No difference in the properties of the siloxanes can be detected, however, when hydrogen atoms are thus present in place of some of the hydroxy groups.

The proportions of the silane starting materials used in the production of coating compositions embodying the invention may be varied within the broad limits hereinbefore described in order to obtain coating compositions having certain specific properties. Thus the preferred proportions of the various classes of silane starting materials which may be used in the practice of the invention vary in accordance with the properties (and the ultimate use) desired of coatings produced from the present compositions.

In general it is preferable that it be at least about 10 mol per cent in order to obtain a greater improvement in the hardness of coatings produced from the present compositions. Although the proportion of a cycloaliphaticsilane used in the production of the present compositions may be as high as 80 mol per cent of the silane starting materials other than tetra-functional silanes, in general it is preferable that it be not more than about 60 mol per cent and it is most desirable that it be not more than about 50 mol per cent of the silane starting materials other than tetra-functional silanes, in order that coatings produced from the present compositions may have excellent hardness without undesirable brittleness. Thus the siloxanol will have an average of 0.1 to 0.80 cycloaliphatic groups per silicon atom, more preferably not more than an average of 0.6 and most preferably not more than an average of 0.5 such groups per silicon atom (when no substantial number of silicon atoms have more than one such group attached thereto).

Compositions of the invention range in properties from those which are air-drying to those which are preferably cured by baking. The use of cycloaliphaticsilanes in the production of the present compositions in general has the effect of hardening coatings produced from the compositions and accelerating their cure, but the magnitude of these effects depends upon the proportion of the cycloaliphaticsilane and the properties the composition would have if it were not modified with a cycloaliphaticsilane.

*Fast-drying coating composition.*—In general, coatings produced from a composition embodying the invention which comprises a siloxane of the invention having an $r/Si$ ratio from about 0.6 to about 1.1 preferably are not cured by baking. Such coatings, particularly if a high proportion of a cycloaliphaticsilane is used in their production (e. g., from about 60 to about 80 mol per cent of the silanes other than tetra-functional silanes), tend to crack and form non-continuous films if they are baked. A composition embodying the invention which comprises a siloxane of an $r/Si$ ratio below 1, produced from a mixture of a cyloaliphaticsilane, an ethylsilane and a tetra-functional silane, may be used without bodying to produce coatings which are air-drying (i. e., coatings which are capable of becoming dry to the touch within about one week at atmospheric temperatures). In general, however, similar compositions which are produced from primary alkylsilanes higher than ethylsilanes need to be bodied before they are applied as coatings if the coatings are to "dry" rapidly enough at ordinary temperatures (i. e., without baking) to be commercially useful. It is most desirable to body such compositions to a tack-free, highly-condensed, substantially cured state (the bodied compositions are, of course, soluble, thermoplastic materials), but when such compositions are produced from only primary alkyl(or aralkyl)silanes in addition to cycloaliphaticsilanes and tetra-functional silanes, there is a great tendency for the compositions to gel upon bodying to such an extent. The preferred compositions of the invention having an $r/Si$ ratio between about 0.6 and about 1.1 are produced from a mixture of silanes which comprises a primary alkyl(or aralkyl)silane, a secondary alkyl(or aralkyl)silane, a cycloaliphaticsilane and a tetra-functional silane (the latter only being necessary, of course, in the production of siloxanes having an $r/Si$ ratio below 1). The secondary alkyl (or aralkyl)silane functions to reduce danger of gelation upon bodying the resin so that such resins may be bodied vigorously to a substantially tack-free state without gelling. It also acts as a plasticizer so that the bodied resin will not be a brittle, hard resin. In the production of resins of an $r/Si$ ratio below 1, the primary alkyl(or aralkyl)silane helps to reduce the formation of gel particles during the resin preparation which results from the difference in the rates of hydrolysis of tetra-functional silanes and secondary alkyl(or aralkyl)silanes. This difference is believed to be great enough that some of the tetra-functional silane molecules may hydrolyze and condense with each other before they can co-condense with hydroxy groups derived from the more slowly hydrolyzed secondary silanes, so that the resulting composition may contain some gel particles (or some emulsification, which makes separation of the water and the resin layer after a hydrolysis reaction difficult). It is believed that the rate of hydrolysis of primary alkylsilanes, particularly those in which the alkyl radicals have from one to six carbon atoms, is intermediate between the rates of hydrolysis of tetra-functional silanes and secondary alkyl(or aralkyl)silanes so that the presence of the primary alkylsilanes tends to "bridge" this difference in hydrolysis rates. (Compositions having an $r/Si$ ratio of at least 1 may be produced from cycloaliphaticsilanes and secondary alkyl(or aralkyl)silanes with no primary alkyl(or aralkyl)silanes, since no tetra-functional silane is required.)

Thus compositions of the invention comprising siloxanes having an $r/Si$ ratio between about 0.6 and about 1.1 may be produced from a combination of silanes such that the compositions may be bodied vigorously to a substantially cured, tack-free state without danger of gelation. Such compositions may be applied as coating compositions from organic solvent solution to produce, upon evaporation of the solvent at ordinary temperature, hard coatings. The preferred compositions of this class are those which comprise siloxanes having an $r/Si$ ratio from about 0.7 to about 0.9, since coatings produced from such compositions have particularly desirable properties. In general, the proportion of a cycloaliphaticsilane in the production of the preferred siloxane resins of the invention of this class should be from about 20 to about 40 mol per cent of the silane starting materials, that is, each silicon in the siloxanol will have an average of 0.2 to 0.40 such groups attached to each silicon atom. The proportion of a secondary alkyl(or aralkyl)silane is preferably from about 20 to about 40 mol per cent of the silane starting materials and the proportion of a primary alkyl(or aralkyl)silane is preferably from about 10 to about 20 mol per cent of the silane starting materials, that is, the siloxanol will have an average of 0.2 to 0.40 of the former, and 0.1 to 0.20 of the latter, attached to each silicon atom. A composition produced from about 30 mol per cent of a cycloaliphaticsilane, 30 mol per cent of a secondary alkyl(or aralkyl)silane, 20 mol per cent of a primary alkyl(or aralkyl)silane and 20 mol per cent of a tetra-functional silane can be bodied to a hard tack-free resin which produces coatings having highly desirable properties. If in such a composition the cycloaliphaticsilane were omitted and replaced with a corresponding proportion of a secondary alkyl (or aralkyl)silane, the resulting composition could be bodied to a tack-free state, but the time of bodying would be greater and the resin would be too soft to form coatings of superior durability. If a more flexible resin is desired, the proportion of secondary alkyl(or aralkyl)silane may be reduced and the proportion of primary alkyl(or aralkyl)silane correspondingly increased, within the limits hereinbefore defined.

The most desirable silanes for use in the production of the class of compositions of the invention which is preferably bodied to a substantially cured state include ethyltrichlorosilane, secondary amyltrichlorosilanes, cyclohexyltrichlorosilane and silicon tetrachloride, since such silanes are relatively inexpensive to prepare and are readily available.

*Baking-type coating composition.*—In general, coatings produced from a composition embodying the invention which comprises a siloxane of the invention having an $r/Si$ ratio from about 1.1 to about 1.7 are preferably cured by baking, because it is difficult to obtain such a siloxane in a tack-free state merely by bodying. The function of secondary alkyl (or aralkyl)silanes in the production of compositions of this class is less important since siloxanes of such $r/Si$ ratios do not gel so readily upon bodying. Such coatings may be more flexible than the coatings produced from lower $r/Si$ ratio resins, although they tend to be less tack-free, unless they are baked. During the curing of compositions of the invention of the class which is preferably cured by baking to produce a finished coating, laminate or other product, the condensation of hydroxy radicals attached to silicon atoms is substantially completed to produce an infusible heat-resistant silicone resin. The use of a cycloaliphaticsilane in the production of such compositions not only prevents the "cheesiness" that is common in films produced from silicone resins of higher $r/Si$ ratio which contain only straight or branched chain alkyl radicals attached to silicon atoms, but also facilitates the cure of such resins.

Small amounts of tetra-functional silanes such as silicon tetrachloride can be used in the production of the class of compositions of the invention which preferably is cured by baking. Such use (which ordinarily should not amount to more than about 4 mol per cent of the composition) makes possible better control of the $r/Si$ ratio. It is usually desirable that the $r/Si$ ratio of compositions of this class be at least about 1.1, and preferable that it be at least about 1.2. It is desirable that the $r/Si$ ratio be not greater than about 1.7, and preferable that it be not greater than about 1.6. Most desirably the $r/Si$ ratio is not greater than about 1.5.

In order to achieve an appreciable improvement in the characteristics of the resulting coatings it is usually desirable, when each molecule of the cycloaliphaticsilane contains three hydrolyzable radicals, that the composition to be condensed be derived to the extent of at least about 10 mol per cent (based upon the total mols of silanes in the composition) from cycloaliphaticsilanes. It is ordinarily preferable that the composition be derived from cycloaliphaticsilanes to the extent of at least about 20 mol per cent. Usually it is desirable that the composition be derived from cycloaliphaticsilanes to an extent amounting to not more than about 70 mol per cent, and it is preferable that it be derived therefrom to an extent amounting to not more than about 50 mol per cent.

It is usually desirable, when each molecule of the cycloaliphaticsilane contains but one cycloaliphatic radical and two hydrolyzable radicals, that the composition be derived to an extent amounting to at least about 10 mol per cent from cycloaliphaticsilanes; it is usually desirable that the composition be derived to an extent amounting to not more than about 70 mol per cent from cycloaliphaticsilanes, and preferable that the composition be derived to an extent amounting to not more than about 60 mol per cent from cycloaliphatiosilanes.

When the composition of the invention is derived in part from a mixture of cycloaliphaticsilanes, part of which mixture is derived from cycloaliphaticsilanes having two hydrolyzable radicals attached to each silicon atom in the silane molecule, and the rest of which mixture is derived from cycloaliphaticsilanes having three hydrolyzable radicals, desirable improvements in the characteristics of the films are obtained when the composition is derived from cycloaliphaticsilanes to an extent intermediate between that specified above for cycloaliphaticsilanes having three hydrolyzable radicals and that specified for cycloaliphaticsilanes having two hydrolyzable radicals.

The preferred resins of the invention of the class which preferably is cured by baking are those derived from primary alkyl(or aralkyl)-silanes which are ethylsilanes, not only because ethylsilanes are less expensive to use than higher alkylsilanes, but also because resins produced from higher alkylsilanes are not as hard and may not be as stable toward heat as those produced from ethylsilanes. Thus, in the practice of the present invention, heat-curable organosilicon compositions of improved quality having an $r/Si$ ratio higher than about 1.1 are preferably produced by a method that includes subjecting to condensation a composition comprising products of the hydrolysis of (1) a primary alkylsilane, as hereinbefore defined, in which the alkyl radicals comprise ethyl radicals and (2) a cycloaliphaticsilane, as hereinbefore defined.

Such compositions have the advantage that after hydrolysis and without gelation they will withstand bodying temperatures that are sufficiently high that all extracting solvent can be distilled from the composition. For example, the products of the hydrolysis of a composition made up of 20 mol per cent of diethyldichlorosilane, 40 mol per cent of ethyltrichlorosilane and 40 mol per cent of cyclohexyltrichlorosilane, after being separated from the hydrolyzing solution, dried, and heated to distill the extracting solvent, can be bodied at a temperature of about 175° C. for 15 minutes; gelation does not result from this treatment. This characteristic of the compositions of the invention is advantageous because it permits viscosity control, and also because it permits removal of all extracting solvent. It is frequently desirable to use the compositions of the invention as solutions in organic solvents; control of the extent of bodying and of the amount of solvent make possible close control of the viscosity of the compositions. A preferred embodiment of the invention involves the co-hydrolysis of an ethylsilane with a cycloaliphaticsilane in which the cycloaliphatic radical is an unsubstituted cyclopentyl or cyclohexyl radical, most desirably cyclohexyl. Since it is usually desirable that a curable resin be derived by hydrolysis of silanes having an average number of hydrolyzable radicals between two and three, a preferred composition comprises silanes having formulas

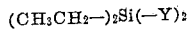

and

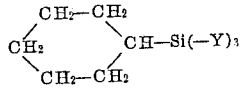

in which Y is a hydrolyzable radical hereinbefore described. The most desirable examples of such silanes are diethyldichlorosilane and cyclohexyltrichlorosilane. In some instances it is desirable to control the average number of hydrolyzable radicals by using a mixture of monoethyl and diethyl hydrolyzable silanes in conjunction with the cycloaliphatic hydrolyzable silanes. The most desirable examples of silanes that are used in such mixtures are ethyltrichlorosilane and diethyldichlorosilane. It is frequently preferable that they be used in conjunction with cyclohexyltrichlorosilane.

*Hydrolysis.*—In the practice of the invention two or more of the silanes hereinbefore described are hydrolyzed by addition to a hydrolyzing solution. The addition should be made at a rate sufficiently slow that the exothermic hydrolysis reaction does not cause local overheating (i. e., at such a rate that one mol of silanes is added in from about 5 to about 10 minutes). It is usually desirable, also, that the hydrolyzing solution be stirred during the silane addition; otherwise, local overheating may result in spite of a slow rate of silane addition.

The hydrolyzing agent may be water alone or (in the case of less readily hydrolyzed silanes) an aqueous solution of mineral acid. It is sometimes desirable to use a water solution of a base, such as NaOH or NH4OH, as the hydrolyzing solution. Halosilanes are readily hydrolyzed by water alone, and it is often desirable to hydrolyze them with a water-ice slurry; the hydrolysis produces a hydrohalic acid which then serves as a catalyst for further hydrolysis. Amino, acyloxy and alkoxy radicals are progressively more difficult to hydrolyze, and amino radicals are more difficult to hydrolyze than halo radicals. It is usually desirable to use a dilute aqueous solution of a mineral acid as the hydrolyzing agent with silanes having hydrolyzable radicals which consist of amino, acyloxy or alkoxy radicals, although it is possible to hydrolyze these radicals with water alone. Aroxy radicals also are difficult to hydrolyze. The mineral acids that are used as hydrolysis catalysts include hydrochloric, sulfuric and phosphoric, hydrochloric usually being preferred. The amount of hydrolyzing solution that is used includes at least enough water to effect complete hydrolysis of the silanes (i. e., at least one gram mol of water for every two gram atoms of hydrolyzable radicals in the silane to be hydrolyzed). It is usually advantageous to use a considerable excess of water, e. g., from 5 to 10 gram mols for every two gram atoms of hydrolyzable radicals, but it is ordinarily not advantageous to use more than about 20 gram mols of water for every two gram atoms of hydrolyzable radicals. To hydrolyze the more readily hydrolyzable silanes it is often advantageous to effect the hydrolysis at a relatively low temperature. As hereinbefore described this is readily accomplished by supplying the water for the hydrolysis in the form of ice.

It is usually desirable to dissolve the silanes in a solvent. Suitable solvents include ethers such as diethyl, ethylpropyls, dipropyls, propylbutyls and cyclic ethers such as dioxane; hydrocarbon solvents such as benzene, toluene, xylenes, hexanes, heptanes, and octanes; ketones such as acetone, methylethylketone and diethylketone; and alcohols such as methyl alcohol, ethyl alcohol, propyl alcohols and butyl alcohols. In some instances, particularly with more difficultly hydrolyzable radicals, it is desirable to use a mutual solvent (i. e., a solvent for both the hydrolyzing solution and the silanes). The lower ketones and lower alcohols are such mutual solvents. In other instances it is desirable to use solvents which dissolve only the silanes so that the hydrolysis is conducted in a two-phase system. Such solvents include the ethers and the higher alcohols. It is usually desirable to use a substantial amount of a solvent or solvents (e. g., from about 100 to about 300 ml. of solvents per gram mol of silanes), although in some instances (e. g., when the silanes are hydrolyzable only with comparative difficulty) it is desirable to use considerably less solvent, while in still other instances (e. g., when the silanes are particularly easy to hydrolyze) it is desirable to use somewhat more solvent.

In the production of siloxane compositions of the invention in which the r/Si ratio is less than 1 (i. e., from about 0.6 to about 1) from silanes containing readily hydrolyzable radicals (e. g., chloro radicals), it is often necessary to conduct the hydrolysis in the presence of certain solvents in order to avoid gelling of the products of the hydrolysis. Suitable solvents include any alcohol which is substantially insoluble in water but has some miscibility in water (e. g., 1-propanol, 1-butanol or a higher primary aliphatic alcohol having up to eight carbon atoms, or mixtures thereof) used in admixture with any aromatic hydrocarbon which is ordinarily employed as a solvent for silanes (e. g., benzene, toluene or xylene) or mixtures thereof. In general, about equal parts by volume of the aromatic hydrocarbon (preferably toluene) and alcohol (preferably 1-butanol) are used, and usually it is desirable initially to divide the aromatic hydrocarbon solvent equally between the silane mixture and the hydrolyzing solution. (It is believed that the partially miscible alcohol solvent avoids confining the hydrolysis of chlorine atoms attached to silicon atoms to an interphase (between water and a solvent insoluble in water) at which there is an insufficiency of water which results in the rapid formation of

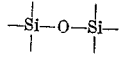

bonds and subsequent gelling. An aromatic hydrocarbon such as toluene acts as a diluent to prevent local high concentration of silicon tetrachloride and resultant gelation. (Toluene is insoluble in water and cannot be used alone without causing the reaction to take place at the interphase between the toluene and the water.)

It has been found that the hydrolysis is usually substantially complete within from about 5 to about 10 minutes after the addition of the silane to the hydrolyzing solution has been completed. Apparently, leaving the silane in contact with the hydrolyzing solution for longer periods of time has no deleterious effect on the resulting products.

When the hydrolysis reaction is conducted with a mutual solvent and is considered to be approximately complete, the mixture of liquids is separated into two components (e. g., by solvent extraction using a solvent which is not miscible with water, such as diethyl ether). It is usually desirable then to extract the water layer again. In the production of resins of an $r/Si$ ratio below 1, it is sometimes desirable to use only the amount of water theoretically required to hydrolyze all the silanes so that separation into two components is not necessary. This particularly is true if the resin is air-drying and can be applied as prepared (after standing for about twenty-four hours to permit sufficient condensation to take place). For example, such a resin may be a resin having an $r/Si$ ratio of about 0.6, prepared from a cycloaliphaticsilane, and ethylsilane and a tetra-functional silane.

When a two-phase hydrolysis reaction has been conducted (i. e., using a solvent for the silane alone) the silane layer is allowed merely to separate from the water layer (e. g., in a separatory funnel) and the water layer is drawn off and extracted with a water immiscible solvent such as diethyl ether. This extract is combined with the silane layer.

The separated solution of hydrolyzed silanes is then washed with water and dried (e. g., over such a drying agent as anhydrous calcium chloride or anhydrous sodium sulfate). The drying agent is removed (e. g., by filtration) and the hydrolyzed silanes are separated from the solvent by heating the silane-solvent mixture at atmospheric pressure. The solvent is assumed to be substantially removed when the temperature of the solution in the vessel rises materially above the boiling temperature of the solvent. It is usually desirable, after the solvent is considered to be substantially removed, to maintain the temperature of the distillation vessel at about the boiling temperature of the solvent, and to reduce the absolute pressure to about 5 inches of mercury for about ten minutes in order to eliminate the last trace of solvent.

*Preparation of coating composition.*—It is ordinarily advantageous to body a siloxane resin of the invention having an $r/Si$ ratio higher than about 1 by heating it slowly to a temperature between about 140° C. and about 160° C. and maintaining the temperature of the resin within this range for about 5 minutes in order to obtain the desired viscosity. It is possible to hydrolyze the primary alkyl(or aralkyl)-silanes (e. g., ethylsilanes) and the cycloaliphaticsilanes separately and to obtain dried solutions of the hydrolyzed silanes in the extraction solvents. The desired composition can then be obtained by mixing the requisite amounts of these solutions and heating to remove the solvents, as described above. It is usually preferable to obtain the compositions by cohydrolyzing the silanes (i. e., hydrolyzing a mixture of a primary alkyl(or aralkyl) silane (such as an ethylsilane and a cycloaliphaticsilane).

The bodied hydrolysis product may be diluted with a solvent that is volatile below about 200° C. Examples of such solvents include benzene, toluene, xylene, acetone, methylethylketone, diethylketone, dioxane, higher alcohols and naphtha-type solvents. Usually it is not desirable to dilute the resin to less than about 50 per cent solids by weight, while in some instances the less viscous resins can be used without dilution, but it is usually preferable to use the resins of the invention after they have been diluted to from about 60 to about 80 per cent solids. It is usually most desirable to use resins of the invention having an $r/Si$ ratio higher than about 1.1 after they have been diluted to about 70 per cent solids. This solution can be condensed to yield an infusible coating. The condensation is accomplished by heating the bodied product to a temperature usually between about 150° C. and about 250° C. for a comparatively short period of time, usually between about one-half hour and about two hours.

As hereinbefore discussed, the preferred siloxane resins of the invention having an $r/Si$ ratio from about 0.6 to about 1.1 may be bodied to a substantially cured, tack-free state so that films of such resins dry at ordinary temperatures without baking. Such resins are preferably bodied by heating slowly at temperatures ranging between about 200° and 240° C. (usually under reduced pressure to facilitate removal of water of condensation). The length of time for which the resin is bodied depends upon the properties of the resin, but ordinarily from about five minutes to about one and one-half hours is sufficient to obtain a substantially tack-free resin of a suitable viscosity which produces coating of superior durability. The highly bodied resins may be diluted with any of the solvents hereinbefore described.

The bodied and diluted compositions of the invention are resinous in character. They may be condensed alone by the action of heat, as hereinbefore described, or they may be used as modifying agents (i. e., condensed in the presence of other resinous materials, including organic resins, such as alkyds, and other siloxanes). The siloxanes with which the resins of the invention can be condensed include those derived by hydrolysis of such silanes as methyltrifluoro- or chloro- or bromo-, dimethyldifluoro- or chloro- or bromo-, trimethylfluoro- or chloro- or bromo-, n-propyltrifluoro- or chloro-, di-n-butyldifluoro-, tri-n-butylfluoro-, isobutyltrichloro-, tri-isobutylbromo-, n-pentyltrifluoro- or chloro-, di-n-pentyldifluoro-, tri-n-pentylfluoro-, methylchlorodifluoro-, methylfluorodichloro-, dimethylfluorochloro-, n-propylchlorodifluoro-, n-propylchlorodifluoro-, isopropylfluorodichloro-, n-butylchlorodifluoro-, n-butylfluorodichloro-, isopentyltrichloro-, tri-isopentylbromo-, methyltriethoxy- or n-butoxy-, dimethyldiethoxy- or n-butoxy-, dimethylchloro-n-butoxy, trimethylmethoxy- or ethoxy- or n- butoxy-, n-propyltriethoxy-, isopropyltriethoxy-, n-butyltriethoxy-, isobutylchloromethoxyethoxy-, isopentyltriethoxy-silanes and the like. When the compositions of the invention are used as modifying agents with organic resins the bodied and diluted resins are mixed with the organic resins. When they are used with other siloxanes a mixture of the silanes can be prepared, and this mixture hydrolyzed to yield a siloxane resin embodying the invention; alternatively, a dried, hydrolyzed solution (in an extracting solvent) of a mixture of silane starting materials which may be used in the present method can be mixed with a dried, hydrolyzed solution of other silanes, and from this mixture can be prepared (as hereinbefore described) a siloxane resin embodying the invention.

Compositions of the invention, when used as modifying agents, should be used in an amount sufficient to accomplish significant improvement in the characteristics of the resin being modified (e. g., siloxanes derived from ethyl- and cycloaliphaticsilanes, in the proportions hereinbefore described, should usually comprise at least about 10 mol per cent of the entire composition and can be 100 per cent of the composition).

When a composition of the invention is used to modify the characteristics of another siloxane composition the r/Si ratio of the entire composition should be from about 0.6 to about 1.7, as hereinbefore described. The composition of the invention used as a modifying agent (i. e., as from about 10 mol per cent to 100 per cent of a coating composition) should be derived from at least about 5 mol per cent, but not more than about 80 mol per cent, of cycloaliphaticsilanes, the remainder being derived from primary and/or secondary alkyl(or aralkyl)silanes and tetrafunctional silanes, as hereinbefore set forth.

Compositions of the invention are advantageous in that they can be cured in a substantially shorter period of time than can similar compositions which are not, however, modified with cycloaliphaticsilanes. This quicker cure is desirable in that it permits a faster curing cycle in practical applications and thereby decreases the cost. Compositions, from either alkylsilanes (e. g., ethylsilanes) or cycloaliphaticsilanes, that crack upon curing, if modified in accordance with the present invention, give films which do not crack upon curing. It is believed that, in some way, the presence of the cycloaliphaticsilanes inhibits formation of cyclic ethylsilane condensation products and promotes long, straight or branched chain molecules. The long molecules are believed to be responsible for the increased flexibility of the films.

EXAMPLE 1

An improved coating composition is prepared by hydrolysis of a mixture of ethylsilanes and cycloaliphaticsilanes according to the following procedure:

A mixture of ethylsilanes (52 grams of diethyldichlorosilane and 55 grams of ethyltrichlorosilane) and a cycloaliphaticsilane (73 grams of cyclohexyltrichlorosilane) is dissolved in a solvent (200 ml. of isopropyl ether). This solution is poured slowly over a stirred hydrolyzing solution (about 400 grams of a cracked ice slurry). When the addition of the silane solution is complete (from about 5 to about 10 minutes after the addition is started) the reaction mixture is stirred for about 10 minutes and the ether layer is separated in a separatory funnel. The ether layer is washed with water, separated from the washings, and dried over anhydrous sodium sulfate for about one hour. The sodium sulfate is removed (by filtration) from the solution of hydrolyzed silanes; the ether is distilled by heating on a steam bath until the temperature of the liquid rises a few degrees above the boiling point of the isopropyl ether; and this temperature is maintained for about five minutes at an absolute pressure of about 4 inches of mercury to remove the last of the solvent. The resin is then bodied by heating to about 150° C. for about 5 minutes, allowed to cool, and diluted with a solvent (toluene) to about 70 weight per cent solids. A film of this resin on a glass plate cures to a hard, clear, crack-free film after about one hour at 200° C.

For purposes of comparison, the procedure of the preceding paragraph is repeated using as the ethylsilanes 62.4 grams of diethyldichlorosilane and 262.4 grams of ethyltrichlorosilane. The silanes are dissolved in 400 ml. of isopropyl ether. No cycloaliphaticsilane is included in the mixture of silanes. This resin gels during bodying.

The procedure of the preceding paragraph is repeated, except that the resin is not bodied. The resin is diluted to 70 weight per cent solids with toluene. A film of this resin on a glass plate is incompletely cured after about 2 hours at 200° C.; after about 3 hours at that temperature it is cured, producing a badly cracked, brittle, flaky film.

The procedure of the first paragraph of the example is repeated using as the ethylsilanes 93.6 grams of diethyldichlorosilane and 229.6 grams of ethyltrichlorosilane, except that no cycloaliphaticsilane is used, and the resin is not bodied. A film of this resin on a glass plate is incompletely cured after about 2 hours at 200° C.; after about 3 hours at that temperature it is cured; the result is a cracked film which curls from the glass plate. This film is not quite so brittle as that produced by the procedure of the preceding paragraph.

The procedure of the first paragraph of the example is repeated using as the ethylsilanes 47 grams of diethyldichlorosilane and 57 grams of ethyltrichlorosilane except that n-butyltrichlorosilane (67 grams) is used in place of the cycloaliphaticsilane. A film of this resin on a glass plate cures after about 1 hour at 200° C. While the film is being cured the odor of butyric acid indicates oxidation of butyl groups. The resulting film cracks and peels from the plate.

The procedure of the first paragraph of the example is repeated using no ethylisilane and using, as the cycloaliphaticsilanes, a mixture of cyclohexylethyldichlorosilane (15.8 grams) and cyclohexyltrichlorosilane (38.2 grams), except that the silanes are dissolved in 50 ml. of isopropyl ether, and this solution is poured over about 100 grams of a cracked ice slurry. A film of this resin on a glass plate cures after about 1 hour at 200° C., but cracks and peels from the plate upon cooling.

EXAMPLE 2

The proportions of ethylsilanes and cycloaliphaticsilanes which produce markedly improved compositions are indicated by the following procedures:

Ten resins are prepared by a procedure that is the same as that described in the first paragraph of Example 1 except that different silane mixtures are hydrolyzed. For convenience these resins are called A, B, C, D, E, F, G, H, I and J.

The amounts of different silanes used to prepare these resins are shown in Table 1 below:

Table 1

| Resin | Grams of diethyldichlorosilane | Grams of ethyltrichlorosilane | Grams of cyclohexyltrichlorosilane |
|---|---|---|---|
| A | 15.7 | 0 | 87.0 |
| B | 15.7 | 49.05 | 21.75 |
| C | 23.6 | 49.05 | 10.88 |
| D | 23.6 | 0 | 76.12 |
| E | 23.6 | 53.14 | 5.44 |
| F | 23.6 | 40.88 | 21.75 |
| G | 31.4 | 16.35 | 43.50 |
| H | 39.3 | 0 | 54.38 |
| I | 47.2 | 0 | 43.50 |
| J | 55.1 | 0 | 32.62 |

Resin E gels during bodying; all other resins cure after about one hour at 200° C. Resin A forms a very hard, brittle film which cracks on cooling. Resin B forms a very hard, clear, crack-free film. Resin C forms a hard, clear, crack-free film which is reasonably flexible. Resin D forms a very hard, clear, crack-free film. Resin F forms a hard, clear, crack-free film that is reasonably flexible. Resin G forms a moderately hard, clear, crack-free film which is quite flexible. Resin H forms a hard, clear, crack-free film which is quite flexible. Resin I forms a thin film (which indicates comparatively large evaporation loss); this film is clear and crack-free, is moderately hard and quite flexible. Resin J forms a film which is about the same as the film from resin I. Resin A (20 mol per cent diethyldichlorosilane and 80 mol per cent cyclohexyltrichlorosilane) and resin E (30 mol per cent diethyldichlorosilane, 65 mol per cent ethyltrichlorosilane and 5 mol per cent cyclohexyltrichlorosilane) also show improvement over the unmodified compositions. Resin A may be bodied to a hard, non-tacky resin, films of which "dry" at ordinary temperatures to form hard, crack-free coatings.

EXAMPLE 3

A sample of a composition prepared by the procedure described in the first paragraph of Example 1 (hereinafter called "resin K") and samples of resins B, F and G are subjected to a series of tests in order to evaluate these resins. Hardness and flexibility of films from these resins are determined by observation and manipulation of the films. A sample of each film is subjected to three hours' exposure to xylene, "Varnolene," acetone, 10 per cent aqueous KOH and 10 per cent aqueous HCl. "Varnolene" is a fraction obtained in the distillation of petroleum, boiling between 310° F. and 410° F., and consists substantially of high boiling aliphatic hydrocarbons. The effect of each of these treatments is determined by observation. A sample of each of the films is also subjected to a 15 minute treatment in boiling water and another sample to 20 hours' exposure to a temperature of 170° C.; the effect of each of these treatments is determined by visual observation. The results of these tests are presented in Table 2 below. In Table 2 "E" is used to indicate that the film is excellent (i. e., apparently unaffected by the test used). G indicates that the film is good (i. e., apparently only very slightly affected by the test used); F that it is fair (i. e., the film is deleteriously affected by the treatment indicated); and 0 indicates a failure of the film. The color of each of the resins is excellent. Films prepared as described herein from mixtures containing 20 mol per cent of diethyldichlorosilane and 80 mol per cent of ethyltrichlorosilane, as well as from mixtures containing 30 mol per cent of diethyldichlorosilane and 70 mol per cent of ethyltrichlorosilane are too badly cracked to withstand tests comparable to those reported in Table 2.

Table 2

| Resins | B | F | K | G |
|---|---|---|---|---|
| Hardness | G | G | F | F |
| Flexibility | F | F | 0 | F+ |
| Xylene (Room temp. 3 hours) | F | F | 0 | F+ |
| "Varnolene" (Room temp. 3 hours) | E | E | E | E |
| Acetone (Room temp. 3 hours) | E | E | E | E |
| 10% KOH (Room temp. 3 hours) | F | F | E | E |
| 10% HCl (Room temp. 3 hours) | E | E | E | G |
| Boiling Water (15 minutes) | E | E | E | E |
| Heat Resistance, 20 hours—170° C | 0 | 0 | F | F |

+ indicates slightly better than the letter symbol.

EXAMPLE 4

The procedure of the first paragraph of Example 1 is repeated using as the ethylsilanes 15.6 grams of diethyldichlorosilane and 32.8 grams of ethyltrichlorosilane, and, as the cycloaliphaticsilane 43.6 grams of cyclohexyltrichlorosilane, except that before the hydrolysis is conducted the silanes are dissolved in 100 ml. of isopropyl ether and the resin is bodied by heating to a temperature between about 170° C. and about 180° C. for 15 minutes. A film of this resin on a glass plate cures to a clear, hard, fairly flexible film after about 1 hour at 200° C.

EXAMPLE 5

An improved coating composition which comprises products of the hydrolysis of a mixture of an ethylsilane and a cycloaliphaticsilane is prepared by a procedure that is the same as that described in the first paragraph of Example 1 using 32.7 grams of cyclohexyltrichlorosilane, 23.4 grams of diethyldichlorosilane and 28.8 grams of n-butyltrichlorosilane, except that before the hydrolysis is conducted the silanes are dissolved in 100 ml. of isopropyl ether. A film of this resin on a glass plate cures after about 1 hour at 200° C. This film shows characteristics that are superior to those of a film prepared by hydrolysis of a mixture of hydrolyzable ethyl and butyl-silanes (e. g., the film prepared by the procedure of the fourth paragraph of Example 1).

EXAMPLE 6

The procedure of the first paragraph of Example 1 is repeated using as the ethylsilanes 26.0 grams of diethyldichlorosilane and 27.5 grams of ethyltrichlorosilane and as the cycloaliphaticsilane 43.5 grams of trimethylcyclohexyltrichlorosilane, except that before the hydrolysis is conducted the silanes are dissolved in 100 ml. of isopropyl ether. A film of this resin on a glass plate cures to a clear, crack-free and very hard film after about 1 hour at 200° C.

EXAMPLE 7

The procedure of the first paragraph of Example 1 is repeated using as the ethylsilane 28.7 grams of ethyltrichlorosilane, and as the cycloaliphaticsilane 15.8 grams of cyclohexylethyldichlorosilane, except that before the hydrolysis is conducted the silanes are dissolved in 50 ml. of isopropyl ether and that this silane solution is poured over 100 ml. of a cracked ice slurry. A film of this resin on a glass plate cures to a clear, hard, crack-free film of fair flexibility after about 1 hour at 200° C.

The procedure of the preceding paragraph is repeated using as the ethylsilane 12.3 grams of ethyltrichlorosilane and as the cycloaliphaticsilanes a mixture of 21.1 grams of cyclohexylethyldichlorosilane and 16.4 grams of cyclohexyltrichlorosilane. A film of this resin on a glass plate cures to a clear, hard, crack-free film of good flexibility after about 1 hour at 200° C.

The procedure of the first paragraph of the example is repeated using as the ethylsilane 16.4 grams of ethyltrichlorosilane and as the cycloaliphaticsilanes a mixture of 26.4 grams of cyclohexylethyldichlorosilane and 5.5 grams of cyclohexyltrichlorosilane. A film of this resin on a glass plate cures to a very hard, clear, crack-free film of good flexibility after about 1 hour at 200° C.

EXAMPLE 8

An improved coating composition is prepared by hydrolysis of a mixture of an ethylsilane and a cycloaliphaticsilane according to the following procedures.

A mixture of an ethylsilane (9.4 grams of diethyldichlorosilane) and a cycloaliphaticsilane (32.0 grams of cyclohexyltrichlorosilane) is dissolved in a solvent (60 ml. of diethyl ether). This solution is poured slowly with vigorous stirring into a hydrolyzing solution (32 ml. of 28 weight per cent ammonium hydroxide and 160 grams of crushed ice). When the addition of the silane solution is complete (from about 5 to about 10 minutes after the addition is started) the reaction mixture is stirred for about 10 minutes and the ether layer is separated in a separatory funnel. The ether layer is washed with water, separated from the washings and dried over anhydrous sodium sulfate for about one hour. The sodium sulfate is removed by filtration and the ether is distilled by heating on a steam bath until the temperature of the liquid rises a few degrees above the boiling point of the diethyl ether. The hydrolysis product remaining after evaporation of the ether is a viscous syrup which is diluted with toluene to about 70 weight per cent solids. A film of this resin on a glass plate cures to a clear, hard, crack-free film after about 2 hours at 200° C.

The procedure of the preceding paragraph is repeated using instead of the cyclohexyltrichlorosilanes 28.0 grams of p-tertiaryamylcyclohexyltrichlorosilane and using 8.0 grams of diethyldichlorosilane, except that the hydrolyzing solution is 30 ml. of 28 weight per cent ammonium hydroxide and 160 grams of crushed ice; the mixture of silanes is dissolved in 100 ml. of diethyl ether; and the viscous syrup obtained after distillation of diethyl ether is bodied by heating to 155° C. for about 1 hour, allowed to cool, and diluted with toluene to about 70 weight per cent solids. A film of this resin on a glass plate cures to a hard, clear, crack-free film after about 3 hours at 200° C.

The coating compositions of the invention derived from a mixture of ethylsilanes and cycloaliphaticsilanes are greatly improved over the previously known compositions prepared from ethylsilanes alone. As the preceding examples demonstrate, compositions prepared from ethylsilanes alone yield films which crack upon cooling so that they are useless. The compositions of the invention, by contrast, derived from a mixture of ethylsilanes and cycloaliphaticsilanes, produce films which are comparatively hard, reasonably flexible and free from cracks. These films show excellent resistance to the action of "Varnolene," acetone, 10 per cent hydrochloric acid and boiling water. These advantages are accomplished without the use of expensive catalytic treatments.

EXAMPLE 9

An improved coating composition, films of which have superior durability without baking, is prepared according to the following procedure: A mixture of pentenes (1.19 mols, comprising a high percentage of 2-pentene) and silicochloroform (1 mol) is pumped into an opening at the bottom of a reactor which consists of a vertical tube approximately twenty inches in length, having an internal diameter of about five inches. The length of the reactor is surrounded by electrically heated coils, covered with asbestos packing, which maintain the temperature in the reactor at approximately 370° C. The reactants are permitted to remain in the reactor for approximately one hour, during which time the pressure inside the reactor is about 1,000 pounds per square inch gauge. The reactor is cooled to room temperature, and the products formed are removed and fractionally distilled through a jacketed column four feet in length packed with glass helices. The products recovered include a 48 per cent yield (based on pentene) of a sec.-amyltrichlorosilane, B. P. 165–170° C. at atmospheric pressure, as well as unreacted silicochloroform and pentenes.

The secondary amyltrichlorosilane mentioned below and in the following examples is prepared by one or more runs in accordance with the above procedure.

A mixture of a cycloaliphaticsilane (348 grams of cyclohexyltrichlorosilane), a secondary alkylsilane (164 grams of a secondary-amyltrichlorosilane), a primary alkylsilane (131 grams of ethyltrichlorosilane) and a tetra-functional silane (136 grams of silicon tetrachloride) in a solvent (900 ml. of butyl acetate) is added dropwise from a dropping funnel with stirring to water (2000 ml.) which is cooled to a temperature below 10° C. The rate of addition is adjusted so that the temperature of the hydrolysis mixture does not rise above 10° C. When the addition, which requires about three hours, is complete, the resin layer is separated from the water layer and is placed in a Claisen flask. The resin layer is distilled to remove the butyl acetate solvent (and residual water). The resin is then bodied under reduced pressure at temperatures ranging between 200 and 220 degrees C. for about eight minutes. The resulting resin, which is hard, brittle and tack-free, is diluted to about a 60 per cent solids concentration with "Solvesso 150" (a commercial solvent comprising both aliphatic and aromatic hydrocarbons).

The solution may be used to produce coatings which do not require baking at elevated temperatures but "dry" at ordinary temperatures.

EXAMPLE 10

The procedure described in the third paragraph of Example 9 is repeated except that the following proportions of the silanes in 900 ml. of butyl acetate are added to 1500 ml. of water: cyclohexyltrichlorosilane (195 grams), a secondary amyltrichlorosilane (185 grams), ethyltrichlorosilane (98 grams) and silicon tetrachloride (102 grams). After distillation of the solvent and water from the resin layer, the resin is bodied under reduced pressure at temperatures ranging between 220 and 225 degrees C. for fifteen minutes. The resulting resin is hard, brittle and tack-free.

The procedure described above is repeated except that the cyclohexyltrichlorosilane is replaced with an equimolar proportion (30 mol per cent) of the secondary amyltrichlorosilane. The resulting resin is bodied under reduced pressure at a temperature of about 230 degrees C. for about one and one-half hours to produce a tack-free resin which is soft and gum-like. Thus it is apparent that the use of a cycloaliphaticsilane (e. g., cyclohexyltrichlorosilane) in compositions of the invention produces a hardness in coatings produced from such compositions which is lacking when the cycloaliphaticsilane is omitted. Furthermore, this superior hardness is obtained after a relatively short bodying period. If in the above procedure only 25 mol per cent of the cyclohexyltrichlorosilane were replaced with the secondary amyltrichlorosilane (i. e., so that 5 mol per cent of the silane starting materials consists of a cycloaliphaticsilane), the resulting resin would be appreciably harder than the soft, gum-like resin which is obtained when the silane starting materials comprise no cycloaliphaticsilane.

EXAMPLE 11

A mixture of a cycloaliphaticsilane (109 grams of cyclohexyltrichlorosilane), a secondary alkylsilane (103 grams of a secondary amyltrichlorosilane), a primary alkylsilane (a mixture of 38 grams of n-butyltrichlorosilane and 65 grams of ethyltrichlorosilane) and a tetra-functional silane (68 grams of silicon tetrachloride) in a solvent (600 ml. of butyl acetate) is added to water (1000 ml.) by the procedure described in the third paragraph of Example 9. After distilling the solvent from the resin layer, the resin is bodied under reduced pressure at temperatures ranging from about 200 to about 230 degrees C. for thirty minutes to obtain a fairly hard gum-like resin which is soluble in the solvents hereinbefore described.

EXAMPLE 12

The procedure described in Example 11 is repeated except that the following silanes are used: cyclohexyltrichlorosilane (130 grams), diethyldichlorosilane (31 grams), a secondary amyltrichlorosilane (123 grams), ethyltrichlorosilane (33 grams) and silicon tetrachloride (68 grams). The resin is bodied under reduced pressure for one hour and fifteen minutes at a temperature of 230 degrees C. to a moderately hard resin which is essentially tack-free.

EXAMPLE 13

A mixture of cyclohexyltrichlorosilane (65 grams), a secondary amyltrichlorosilane (62 grams), phenyltrichlorosilane (42 grams) and silicochloroform (27 grams) in a solvent (300 ml. of butyl acetate) is added dropwise from a dropping funnel with stirring to water (500 ml.) which is cooled to a temperature below 10 degrees C. The rate of addition is adjusted so that the temperature of the hydrolysis mixture does not rise above 10 degrees C. When the addition, which requires about 45 minutes, is complete, the resin layer is separated from the aqueous layer.

A sample of the resin solution is filmed on a glass plate and is baked in an oven at a temperature of 130 degrees C. for one hour. The resulting film is hard, tough and tack-free. The remainder of the resin solution is placed in a Claisen flask and is distilled to remove the butyl acetate solvent. The resin is heated to 250° C. and is then allowed to cool. The cooled resin is diluted with toluene to a solids concentration of about 60 per cent. A sample of the diluted resin filmed on a tin panel and baked for one hour in an oven at a temperature of 130 degrees C. yields a fairly hard, tough film with a very slight tackiness. When this filmed panel is placed for ten minutes in an oven at 200 degrees C., the hard film becomes tack-free and has good adhesion to the tin panel. Other samples of the resin filmed on glass plates cure in fifteen minutes at 200 degrees C. or in one hour at 150 degrees C. to form hard, tough films.

EXAMPLE 14

An alkyltrihalosilane is chlorinated by means of a reaction with molecular chlorine according to the following procedure: An alkyltrihalosilane (357 grams of cyclohexyltrichlorosilane) is placed in a glass tube approximately three feet in length, having an internal diameter of about 50 mm., packed at the bottom with Raschig rings (to a height of about 5 cm.) and fitted with a gas inlet tube (having an internal diameter of about 6 mm.) which is sealed through the bottom of the tube so that the chlorine is discharged from a vertical section of this tube (near the bottom of the reactor) into the alkyltrihalosilane. The top of the reactor tube is fitted with a Dry-Ice condenser and a glass tube which conducts any gases not condensed in the Dry-Ice condenser to a water scrubber where the HCl formed by the chlorination is removed. The amount of HCl absorbed in the water scrubber is determined by titration with sodium hydroxide. Into the silane (which is at a temperature of about 25 degrees C.) is introduced chlorine (at a temperature of about 25 degrees C.) for about 100 minutes at such a rate that about 1.67 mols of hydrogen chloride are collected in the water scrubber during the 100 minutes. The liquid remaining in the reactor is separated by fractional distillation to yield cyclohexyltrichlorosilane (112 grams) and a mixture of chlorocyclohexyltrichlorosilanes (174 grams) boiling in the range between 108 degrees C. and 111 degrees C. at an absolute pressure of 6 mm. of mercury.

A mixture of chlorocyclohexyltrichlorosilanes (78 grams, prepared by the procedure described in the preceding paragraph) and toluene (86 grams) are stirred in a 500 ml. three-necked flask equipped with a mercury sealed stirrer and a reflux condenser fitted with a calcium chloride tube. Aluminum chloride (0.45 gram) is added to the stirred mixture in small portions over a period of twenty minutes. Heat is applied during the last ten minutes of the addition to bring the toluene to reflux. The mixture is refluxed for about one hour. The reaction mixture is distilled under reduced pressure to yield a crude tolylcyclohexyltrichlorosilane (65 grams), B. P. 193–196 degrees C. at 14 mm. Hg. This product is redistilled under reduced pressure to yield a water white tolylcyclohexyltrichlorosilane, B. P. 159–160 degrees C. at 2 mm. Hg.

A mixture of a tolylcyclohexyltrichlorosilane (46.2 grams, prepared by the procedure described in the preceding paragraph) and ethyltrichlorosilane (32.8 grams) dissolved in a solvent (50 ml. of dioxane) is charged into a three-necked flask fitted with a stirrer, a reflux condenser and a dropping funnel. A mixture of water (9.4 grams) with dioxane (50 ml.) is charged into the dropping funnel and is added dropwise with stirring to the mixture in the flask. When the addition is complete, the mixture is refluxed for one-half hour, during which time HCl is evolved. After adding dimethyldichlorosilane (19.3 grams) to the flask, water (5.8 grams) is then added dropwise from the dropping funnel. The mixture is again refluxed for one-half hour to expel HCl. The mixture is allowed to cool slightly and water (300 ml.) is added. The mixture is then stirred vigorously. Methyl orange indicator is added and then ammonium hydroxide is added until the reaction mixture is alkaline. A few drops of HCl are then added to make the mixture just slightly acid. The mixture is then cooled and ether (250 ml.) is added to extract the resin from the water. The ether layer is separated in a separatory funnel, washed with water, separated from the washings and dried over sodium sulfide. The dried solution is filtered from the drying agent and the ether is removed from the solution by distillation. The resulting resin is moderately viscous.

A sample of the resin filmed on a glass plate and baked in an oven at a temperature of 200 degrees C. for one hour yields a hard, clear, glossy film. The remainder of the resin is placed in a small Claisen flask and is heated under reduced pressure for one hour at 180 degrees C. Upon cooling, a hard "rosin-like" resin is obtained, which is diluted with xylene to a 60 per cent solids concentration. A sample of the resin filmed on a glass plate and baked for one hour at 200 degrees C. yields a hard, clear, glossy film which is somewhat more flexible than the film obtained from the unbodied resin.

EXAMPLE 15

The procedure described in the third paragraph of Example 14 is repeated except that no ethyltrichlorosilane is used, the proportion of tolylcyclohexyltrichlorosilane used is 30.6 grams, the initial proportion of water added in admixture with 50 ml. of dioxane is 1.8 grams and the proportion of water added after addition of the dimethyldichlorosilane is 3.6 grams.

After distilling the ether, a sample of the resulting resin is filmed on a glass plate and baked for one hour at 200 degrees C. to yield a clear, very hard film. A resin of such a high $r$/Si ratio (i. e., about 1.6) that is not derived from a cycloaliphaticsilane ordinarily is a soft, slow-curing resin. Thus the use of a cycloaliphaticsilane such as a tolylcyclohexyltrichlorosilane in accordance with the present invention produces a marked hardening effect on silicone films of high $r$/Si ratio.

This is a continuation in part of application Serial No. 17,805, filed March 29, 1948 and now abandoned.

I claim:

1. A composition that produces superior coatings upon hydrolysis, comprising (1) a silane whose molecule consists of a silicon atom to which are attached four monovalent radicals from one to two of which are ethyl and from two to three of which are hydrolyzable radicals; and (2) a silane whose molecule consists of a silicon atom to which are attached four monovalent radicals not more than one of which is an alkyl radical having from one to two carbon atoms; from two to three of which are hydrolyzable radicals; and one of which is a saturated cycloaliphatic hydrocarbon radical having a single nucleus containing from five to six carbon atoms each of which is connected to at least one hydrogen atom, having from five to eleven carbon atoms, and having not more than three side chains containing a total of not more than five carbon atoms, the molar ratio of (1) to (2) ranging from 2:3 to 9:1, and the ratio $r$/Si ranging from 1.1 to 1.7, wherein $r$ is the total number of non-hydrolyzable radicals attached to silicon and Si is the total number of silicon atoms.

2. A composition as claimed in claim 1 in which the saturated cycloaliphatic hydrocarbon radical has no side chains.

3. A composition as claimed in claim 1 in which the saturated cycloaliphatic hydrocarbon radical is cyclohexyl.

4. A composition that produces superior coatings upon hydrolysis, comprising (1) a silane whose molecule consists of a silicon atom to which are attached two ethyl radicals and two monovalent hydrolyzable radicals; and (2) a silane whose molecule consists of a silicon atom to which are attached a cyclohexyl radical and three monovalent hydrolyzable radicals, the molar ratio of (1) to (2) ranging from 2:3 to 9:1, and the ratio $r$/Si ranging from 1.1 to 1.7, wherein $r$ is the total number of non-hydrolyzable radicals attached to silicon and Si is the total number of silicon atoms.

5. A composition that produces superior coatings upon hydrolysis, comprising (1) a diethyldichlorsilane and (2) cyclohexyltrichlorosilane, the molar range of (1) to (2) ranging from 2:3 to 9:1, and the ratio $r$/Si ranging from 1.1 to 1.7, wherein $r$ is the total number of non-hydrolyzable radicals attached to silicon and Si is the total number of silicon atoms.

6. A composition that produces superior coatings upon hydrolysis, comprising (1) diethyldichlorosilane and ethyltrichlorosilane and (2) cyclohexyltrichlorosilane, the molar ratio of (1) to (2) ranging from 2:3 to 9:1, and the ratio $r$/Si ranging from 1.1 to 1.7, wherein $r$ is the total number of non-hydrolyzable radicals attached to silicon and Si is the total number of silicon atoms.

7. A method of producing organosilicon compositions that includes subjecting to condensation a composition comprising products of the hydrolysis of (1) a silane whose molecule consists of a silicon atom to which are attached four monovalent radicals from one to two of which are ethyl and from two to three of which are hydrolyzable radicals; and (2) a silane whose molecule consists of a silicon atom to which are attached four monovalent radicals not more than one of which is an alkyl radical having from one to two carbon atoms; from two to three of which are hydrolyzable radicals; and one of which is a saturated cycloaliphatic hydrocarbon radical having a single nucleus containing from five to six carbon atoms each of which is connected to at least one hydrogen atom, having from five to eleven carbon atoms, and having not more than three side chains containing a total of not more than five carbon atoms, the molar ratio of (1) to (2) ranging from 2:3 to 9:1, and the ratio $r$/Si ranging from 1.1 to 1.7, wherein $r$ is the total number of non-hydrolyzable radicals attached to silicon and Si is the total number of silicon atoms.

8. A method as claimed in claim 7 in which the saturated cycloaliphatic hydrocarbon radical has no side chains.

9. A method as claimed in claim 7 in which the saturated cycloaliphatic hydrocarbon radical is cyclohexyl.

10. A method of producing organosilicon compositions that includes subjecting to condensation a composition comprising products of the hydrolysis of (1) a silane whose molecule consists of a silicon atom to which are attached two ethyl radicals and two monovalent hydrolyzable radicals; and (2) a silane whose molecule consists of a silicon atom to which are attached a cyclohexyl radical and three monovalent hydrolyzable radicals, the molar ratio of (1) to (2) ranging from 2:3 to 9:1, and the ratio $r/Si$ ranging from 1.1 to 1.7, wherein $r$ is the total number of non-hydrolyzable radicals attached to silicon and Si is the total number of silicon atoms.

11. A method of producing organosilicon compositions that includes subjecting to condensation a composition comprising products of the hydrolysis of (1) diethyldichlorosilane and (2) cyclohexyltrichlorosilane, the molar ratio of (1) to (2) ranging from 2:3 to 9:1, and the ratio $r/Si$ ranging from 1.1 to 1.7, wherein $r$ is the total number of non-hydrolyzable radicals attached to silicon and Si is the total number of silicon atoms.

12. A method of producing organosilicon compositions that includes subjecting to condensation a composition comprising products of the hydrolysis of (1) diethyldichlorosilane and ethyltrichlorosilane and (2) cyclohexyltrichlorosilane, the molar ratio of (1) and (2) ranging from 2:3 to 9:1 and the ratio $r/Si$ ranging from 1.1 to 1.7, wherein $r$ is the total number of non-hydrolyzable radicals attached to silicon and Si is the total number of silicon atoms.

13. A method as claimed in claim 7 in which the composition subjected to condensation comprises products of the co-hydrolysis of the two silanes.

14. A composition comprising products of the hydrolysis of (1) a silane whose molecule consists of a silicon atom to which are attached four monovalent radicals from one to two of which are ethyl and from two to three of which are hydrolyzable radicals; and (2) a silane whose molecule consists of a silicon atom to which are attached four monovalent radicals not more than one of which is an alkyl radical having from one to two carbon atoms; from two to three of which are hydrolyzable radicals; and one of which is a saturated cycloaliphatic hydrocarbon radical having a single nucleus containing from five to six carbon atoms each of which is connected to at least one hydrogen atom, having from five to eleven carbon atoms, and having not more than three side chains containing a total of not more than five carbon atoms, the molar ratio of (1) to (2) ranging from 2:3 to 9:1, and the ratio $r/Si$ ranging from 1.1 to 1.7, wherein $r$ is the total number of non-hydrolyzable radicals attached to silicon and Si is the total number of silicon atoms.

15. A composition as claimed in claim 14 in which the saturated cycloaliphatic hydrocarbon radical has no side chains.

16. A composition as claimed in claim 14 in which the saturated cycloaliphatic hydrocarbon radical is cyclohexyl.

17. A composition comprising products of the hydrolysis of (1) a silane whose molecule consists of a silicon atom to which are attached two ethyl radicals and two monovalent hydrolyzable radicals; and (2) a silane whose molecule consists of a silicon atom to which are attached a cyclohexyl radical and three monovalent hydrolyzable radicals, the molar ratio of (1) to (2) ranging from 2:3 to 9:1, and the ratio $r/Si$ ranging from 1.1 to 1.7, wherein $r$ is the total number of non-hydrolyzable radicals attached to silicon and Si is the total number of silicon atoms.

18. A composition comprising products of the hydrolysis of (1) diethyldichlorosilane and (2) cyclohexyltrichlorosilane, the molar ratio of (1) to (2) ranging from 2:3 to 9:1, and the ratio $r/Si$ ranging from 1.1 to 1.7, wherein $r$ is the total number of non-hydrolyzable radicals attached to silicon and Si is the total number of silicon atoms.

19. A composition comprising products of the hydrolysis of (1) diethyldichlorosilane and ethyltrichlorosilane and (2) cyclohexyltrichlorosilane, the molar ratio of (1) to (2) ranging from 2:3 to 9:1, and the ratio $r/Si$ ranging from 1.1 to 1.7, wherein $r$ is the total number of non-hydrolyzable radicals attached to silicon and Si is the total number of silicon atoms.

20. A composition comprising products of the hydrolysis of a composition claimed in claim 1.

21. A coating composition that forms coatings of improved durability, comprising a siloxanol whose molecules consist of silicon atoms to which are attached (1) OH groups, (2) oxygen linkages connecting silicon atoms, (3) up to 1.60 radicals, having from one to nine carbon atoms, per silicon atom, in which the free valance is attached to a primary acyclic carbon atom, (4) up to 0.75 radical, having from three to nine carbon atoms in which the free valence is attached to a secondary acyclic carbon atom, per silicon atom, and (5) radicals having a single cycloaliphatic nucleus containing from five to six carbon atoms each of which is connected to at least one hydrogen atom and one of which is connected to the free valence, having from five to thirteen carbon atoms, and having not more than three side chains containing a total of not more than seven carbon atoms, no substantial number of silicon atoms having more than one (5) radical attached thereto, the total number of radicals (3) and (4) per silicon atom being at least 0.2 but not more than 1.60, the number of radicals (5) per silicon atom being from 0.1 to 0.8, the total number of radicals (3), (4) and (5) per silicon atom being not greater than 1.7, the silicon atoms to which the radicals (3), (4) and (5) are attached constituting not less than 60 per cent of the total silicon atoms, and not more than 80 per cent of the former silicon atoms having radicals (5) attached thereto.

22. A coating composition as claimed in claim 21 wherein the number of radicals (3) per silicon atom is from 0.1 to 0.2; the number of radicals (4) per silicon atom is from 0.2 to 0.4; and the number of radicals (5) per silicon atom is from 0.2 to 0.4.

23. A coating composition as claimed in claim 22 in which the (3) radicals are ethyl, the (4) radicals are sec-amyl, the (5) radicals are cyclohexyl, and the siloxanol has been heat-bodied so as to form a tack-free coating on air-drying.

24. A coating composition as claimed in claim 21 wherein each of the radicals (3) is a primary alkyl radical having from one to six carbon atoms; the number of radicals (3) per silicon atom is from 0.1 to 0.2; the number of radicals (4) per silicon atom is from 0.2 to 0.4; the number of radicals (5) per silicon atom is from 0.2 to 0.4; and the total number of radicals (3), (4) and (5) per silicon atom is from 0.7 to 0.9.

25. A coating composition as claimed in claim 21 wherein each of the radicals (3) is an ethyl radical; each of the radicals (4) is a secondary amyl radical; each of the radicals (5) is a cyclohexyl radical; and there are 0.2 radicals (3), 0.3 radicals (4) and 0.3 radicals (5) per silicon atom.

References Cited in the file of this patent

UNITED STATES PATENTS

| Number | Name | Date |
|---|---|---|
| 2,482,276 | Hyde | Sept. 20, 1949 |
| 2,486,162 | Hyde | Oct. 25, 1949 |

FOREIGN PATENTS

| Number | Country | Date |
|---|---|---|
| 573,960 | Great Britain | Dec. 14, 1945 |